United States Patent Office.

HENRY SAWYER, OF BOSTON, MASSACHUSETTS.

Letters Patent No. 63,754, dated April 9, 1867.

IMPROVED STARCH GLOSS.

The Schedule referred to in these Letters Patent and making part of the same.

TO ALL TO WHOM THESE PRESENTS SHALL COME:

Be it known that I, HENRY SAWYER, of Boston, in the county of Suffolk, and State of Massachusetts, have made a new and useful invention of a Material to be Combined with Starch, and do hereby declare the following to be a full, clear, and exact description thereof, reference being had to the accompanying specimens.

The invention consists of the employment or use of paraffine in combination with starch, to give it a glossy, polished appearance, as well as to add to the stiffening properties of the starch.

I am aware that a composition composed of tallow and wax has been used for this purpose, but there are several objections to this preparation, one being the greasy nature of the tallow, which is liable to stain or spot the linen on passing a hot iron over it. Another objection is the difficulty of making the wax unite with or incorporate itself with the starch. Furthermore, this composition has too much bulk or body, and is apt to leave a sticky coating on the surface of the material with which it is used. The paraffine, on the contrary, owing to its peculiar properties, incorporates itself with the starch, is free from the other objections above mentioned, and gives a peculiarly glossy, white appearance to the linen.

What I claim as my invention, and desire to secure by Letters Patent, is the use or employment of paraffine in combination with starch, substantially in the manner and for the purpose as before described.

HENRY SAWYER.

Witnesses:
    H. G. PARKER,
    FRED. CURTIS.